United States Patent
Kim et al.

(10) Patent No.: US 11,580,629 B2
(45) Date of Patent: Feb. 14, 2023

(54) SYSTEM AND METHOD FOR DETERMINING SITUATION OF FACILITY BY IMAGING SENSING DATA OF FACILITY

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Hyunki Lim, Seoul (KR); Yeji Choi, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 269 days.

(21) Appl. No.: 17/013,859

(22) Filed: Sep. 8, 2020

(65) Prior Publication Data
US 2021/0125323 A1 Apr. 29, 2021

(30) Foreign Application Priority Data
Oct. 25, 2019 (KR) .................. 10-2019-0133998

(51) Int. Cl.
*G06T 7/00* (2017.01)
*G06T 7/90* (2017.01)

(52) U.S. Cl.
CPC .......... *G06T 7/001* (2013.01); *G06T 7/90* (2017.01); *G06T 2207/10024* (2013.01); *G06T 2207/20081* (2013.01); *G06T 2207/30108* (2013.01)

(58) Field of Classification Search
CPC . G06T 7/001; G06T 7/90; G06T 2207/10024; G06T 2207/20081; G06T 2207/30108
See application file for complete search history.

(56) References Cited

U.S. PATENT DOCUMENTS

| | | | |
|---|---|---|---|
| 10,481,581 B2 | 11/2019 | Bierweiler et al. | |
| 2007/0005528 A1* | 1/2007 | Mukherjee | G06K 9/6247 706/15 |
| 2007/0090059 A1* | 4/2007 | Plummer | G05B 23/0235 210/743 |
| 2007/0178844 A1* | 8/2007 | Ii | H04B 17/382 455/67.11 |
| 2014/0283144 A1* | 9/2014 | Gettings | G06F 21/6218 726/30 |

(Continued)

FOREIGN PATENT DOCUMENTS

| | | | |
|---|---|---|---|
| CN | 110177122 A | * | 8/2019 |
| JP | 2019-70930 A | | 5/2019 |

(Continued)

OTHER PUBLICATIONS

US 10,394,231 B2, 08/2019, Matsubara et al. (withdrawn)

(Continued)

*Primary Examiner* — Yubin Hung
(74) *Attorney, Agent, or Firm* — Cantor Colburn LLP

(57) ABSTRACT

Embodiments relate to a method and system for determining a situation of a facility by imaging a sensing data of the facility including receiving sensing data through a plurality of sensors at a query time, generating a situation image at the query time, showing the situation of the facility at the query time based on the sensing data, and determining if an abnormal situation occurred at the query time by applying the situation image to a pre-learned situation determination model.

18 Claims, 11 Drawing Sheets

(56) References Cited

U.S. PATENT DOCUMENTS

| | | | |
|---|---|---|---|
| 2019/0072942 A1 | 3/2019 | Park et al. | |
| 2019/0227520 A1 | 7/2019 | Chen et al. | |
| 2020/0081817 A1* | 3/2020 | Gross | G06K 9/6267 |
| 2021/0125323 A1* | 4/2021 | Kim | G06V 10/774 |

FOREIGN PATENT DOCUMENTS

| | | |
|---|---|---|
| KR | 1020110118023 A | 10/2011 |
| KR | 1020130112968 A | 10/2013 |
| KR | 1020170125237 A | 11/2017 |
| KR | 1020170125265 A | 11/2017 |
| KR | 10-1818394 B1 | 1/2018 |
| KR | 1020190025474 A | 3/2019 |
| KR | 10-2019-0067441 A | 6/2019 |

OTHER PUBLICATIONS

Mathur et al. ("SWaT: a water treatment testbed for research and training on ICS security," International Workshop on Cyber-physical Systems for Smart Water Networks; Date of Conference: Apr. 11-11, 2016) (Year: 2016).*

Ian J. Goodfellow et al., "Generative Adversarial Nets," Proceedings of the 27th International Conference on Neural Information Processing Systems, Dec. 2014, pp. 2672-2680, vol. 2.

Dan Li et al., "MAD-GAN: Multivariate Anomaly Detection for Time Series Data with Generative Adversarial Networks," International Conference on Artificial Neural Networks, 2019.

* cited by examiner

Situation secondary image of normal situation

No failed sensor

Situation secondary image of abnormal situation

Failed sensor location detection

SYSTEM AND METHOD FOR DETERMINING SITUATION OF FACILITY BY IMAGING SENSING DATA OF FACILITY

CROSS-REFERENCE TO RELATED APPLICATION

This application claims priority to Korean Patent Application No. 10-2019-0133998, filed on Oct. 25, 2019, and all the benefits accruing therefrom under 35 U.S.C. § 119, the contents of which in its entirety are herein incorporated by reference.

BACKGROUND

1. Field

The present disclosure relates to technology that monitors a situation of a facility, and more particularly, to a system and method that converts sensing data acquired through a plurality of sensors installed in a facility into an image showing a real-time situation of the facility, and determines if an abnormal situation occurred based on the situation image.

[Description about National Research and Development Support]

This study was supported by the Korea Institute of Energy Technology Evaluation and Planning (Project Name. Development of prediction, diagnosis and analysis of failure of power generation facility based on artificial intelligence, Project No. 20181110100420) under the superintendence of Ministry of Trade, Industry and Energy, Republic of Korea.

2. Description of the Related Art

Currently, a large-scale advanced factory achieves automation to an extent. However, in the 21st century, as the population grows older, the labor force declines and the number of skilled labor force gradually reduces. With the diversity of customers' demand, the product lifetime gradually becomes shorter, so factory on the existing level of automation is very difficult to survive in today's business environment.

With the recent development of IT technology, an attempt is made on smart factory with advanced factory automation. The smart factory is a factory in which all processes are automatically performed without users' need to assemble and package each product and check machinery by hand. Particularly, as opposed to the existing automatic factory in which simply parts involved in production are automated, it is possible to produce products while actively responding to the situation of the factory using Internet of Things (IoT) technology.

The smart factory measures sensing data in real time using a plurality of sensors installed to ensure stability of equipment (for example, important components) while in operation. For accurate measurement, the smart factory includes various types of sensors suitable for systems in the factory and the type of equipment.

The situation of the smart factory is diagnosed using statistical methodology and a time-series data input based neural network model based on the sensing data of the plurality of sensors. Here, the statistical methodology includes regression analysis and Auto-regressive Integrated Moving Average (ARIMA), and the neural network model includes Recurrent Neural Networks (RNN) and Long Short-Term Memory models (LSTM).

Data that is created in the smart factory includes multiple types of time-series data (for example, multivariate time-series data). The statistical methodology has a limitation in finding an optimal variable with the increasing variables of input data. The neural network model has a limitation in analyzing the partial correlation between multiple variables due to all variables of input data being fully connected to one another.

SUMMARY

According to an aspect of the present disclosure, there is provided a system in which in determining an on-the-spot situation based on multivariate time-series data, the multivariate time-series data is imaged for processing of local connectivity between multivariate data, and an abnormal situation is determined by learning a relationship between the image and the situation based on the converted situation image.

In addition, there is provided a method for determining a situation of a power plant and a computer-readable medium having the method recorded thereon.

A method for determining a situation of a facility by imaging a sensing data of the facility according to an aspect of the present disclosure is performed by a computing device including a processor, and the method may include receiving sensing data through a plurality of sensors at a query time, generating a situation image at the query time, showing the situation of the facility at the query time based on the sensing data, and determining if an abnormal situation occurred at the query time by applying the situation image to a pre-learned situation determination model.

In an embodiment, the plurality of sensors may have a plurality of types, and the sensing data may be multivariate time-series data.

In an embodiment, the method may further include pre-processing to normalize the sensing data before generating the situation image.

In an embodiment, generating the situation image may include arranging the sensing data of each sensor at the query time, and forming an N*N pixel set when the plurality of sensors is N, and each pixel is associated with a first sensor and a second sensor.

In an embodiment, arranging the sensing data of each sensor at the query time may include arranging according to a pre-stored sensor sequence number, and the sensor sequence number may be in accordance with an operating sequence of equipment in the facility.

In an embodiment, generating the situation image may include calculating a color value of a pixel at the query time, based on a difference between first sensing data and second sensing data at the query time, received through a first sensor and a second sensor associated with the pixel, searching for a color corresponding to the calculated color value in a pre-stored color table, and giving the found color to the color.

In an embodiment, calculating the color value of the pixel at the query time may include calculating the color value of the pixel for each time based on a magnitude difference between first sensing data and second sensing data during a predetermined time interval than the query time, applying a time weight for each time to the color value for each time, respectively, and calculating the color value of the pixel on the predetermined time interval as the color value of the pixel at the query time based on a result of applying the weight.

In an embodiment, the time weight for each time may have a higher value as it is closer to the query time.

In an embodiment, determining if the abnormal situation occurred at the query time may include generating a situation secondary image by applying the situation image to a pre-learned situation determination model, calculating an anomaly score at the query time based on the situation image and the situation secondary image, and determining that the abnormal situation occurred at the query time when the anomaly score is higher than a preset threshold.

In an embodiment, the situation determination model may be learned to generate output data belonging to the data distribution of training sample or having a minimum reconstruction error with the data distribution.

In an embodiment, the training samples used for learning may include sensing data of a normal situation, and the data distribution may be a data distribution of the situation image of the training samples.

In an embodiment, the situation determination model is configured to generate the situation secondary image having a smallest vector distance with the situation image showing the normal situation, when the situation image generated based on the sensing data including the sensing data of the abnormal situation is applied.

In an embodiment, the method may further include detecting the sensor having sensed the abnormal situation based on the situation image, when it is determined as the abnormal situation.

In an embodiment, detecting the sensor may include generating a residual image at the query time based on the situation image and the situation secondary image generated by the situation determination model, determining a pixel having a larger color value than a preset residual threshold based on the color value of the pixel included in the residual image, and determining a sensor associated with the determined pixel, and the residual threshold may be larger than the color value of the pixel within the residual image based on the sensing data of the normal situation.

In an embodiment, determining the sensor associated with the determined pixel may include determining the associated sensor based on the sequence number of the sensor associated with the determined pixel within the residual image.

A computer-readable recording medium according to another aspect of the present disclosure may store program instructions that can be read by a computing device and executed by the computing device. When the program instructions are executed by a processor of the computing device, the program instructions enable the processor to perform the method for determining a situation of a facility according to the above-described embodiments.

A system for determining a situation of a facility by imaging a sensing data of the facility according to still another aspect of the present disclosure may include a plurality of sensors installed in the facility, a receiving device to receive sensing data through the plurality of sensors, an image conversion unit to generate a situation image showing the situation of the facility at the query time based on the sensing data, a situation determination unit to determine if an abnormal situation occurred at the query time by applying the situation image to a pre-learned situation determination model, and an anomaly location detection unit to detect the sensor having sensed an abnormal situation when the situation of at least a part of the facility is determined to be the abnormal situation.

In an embodiment, the situation determination model may be learned to generate output data belonging to the data distribution of training sample or having a minimum reconstruction error with the data distribution.

In an embodiment, the situation determination model is configured to generate a situation secondary image having a smallest vector distance with the situation image showing the normal situation, when the situation image generated based on the sensing data including the sensing data of the abnormal situation is applied.

In an embodiment, the anomaly location detection unit may be configured to generate a residual image at the query time based on the situation image and the situation secondary image generated by the situation determination model, determine a pixel having a larger color value than a preset residual threshold based on a color value of a pixel included in the residual image, and determine a sensor associated with the determined pixel, and the residual threshold may be larger than the color value of the pixel within the residual image based on the sensing data of the normal situation.

The system for determining a situation of a facility according to an aspect of the present disclosure may determine if an abnormal situation occurred using multivariate time-series data acquired through at least two types of sensors.

Particularly, it is possible to determine the situation based on local connectivity of multivariate time-series data by imaging of the multivariate time-series data through a situation determination model.

In addition, when the situation is determined to be abnormal, it is possible to detect a location of a sensor having sensed the abnormal situation or a location at which the abnormal situation occurred, by generating a residual image based on a situation image and a situation secondary image generated from the situation image.

The effects of the present disclosure are not limited to the above-mentioned effects, and other effects not mentioned herein will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some modified elements such as exaggerated and omitted elements.

DETAILED DESCRIPTION

The terminology used herein is for the purpose of describing particular embodiments only and is not intended to be limiting of the present disclosure. The singular forms as used herein are intended to include the plural forms as well, unless the context clearly indicates otherwise. The term "comprises" when used in this specification, specifies the presence of stated features, regions, integers, steps, operations, elements and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

In the specification, an abnormal situation includes all situations that affect the operation result of equipment in a preset facility such as a failure and a fault in the equipment and/or a defect that is highly likely to cause the above-described situations such as a malfunction and an overload. For example, the abnormal situation may include a failure situation and a dangerous situation. A normal situation is a situation other than the abnormal situation, and refers to a situation in which the operation result of a preset power plant can be obtained. For example, when an error is in a rated range, it may be referred to as the normal situation.

Additionally, the abnormal situation includes a failure in a sensor. In the event of the failure in the sensor, specific equipment that the failed sensor is responsible for sensing may normally work without a failure at a specific time. However, when the specific equipment actually fails in the future, an additional problem may occur due to the failure in the sensor.

In the specification, the facility refers to a variety of structures including a plurality of equipment. For example, the facility may include a power plant, a factory and a smart factory. Hereinafter, for clarity of description, the facility in which a system is installed is referred to as a smart factory, but it will be obvious to those skilled in the art that the facility is not limited thereto.

Hereinafter, embodiments of the present disclosure will be described in detail with reference to the accompanying drawings.

Figure 1:
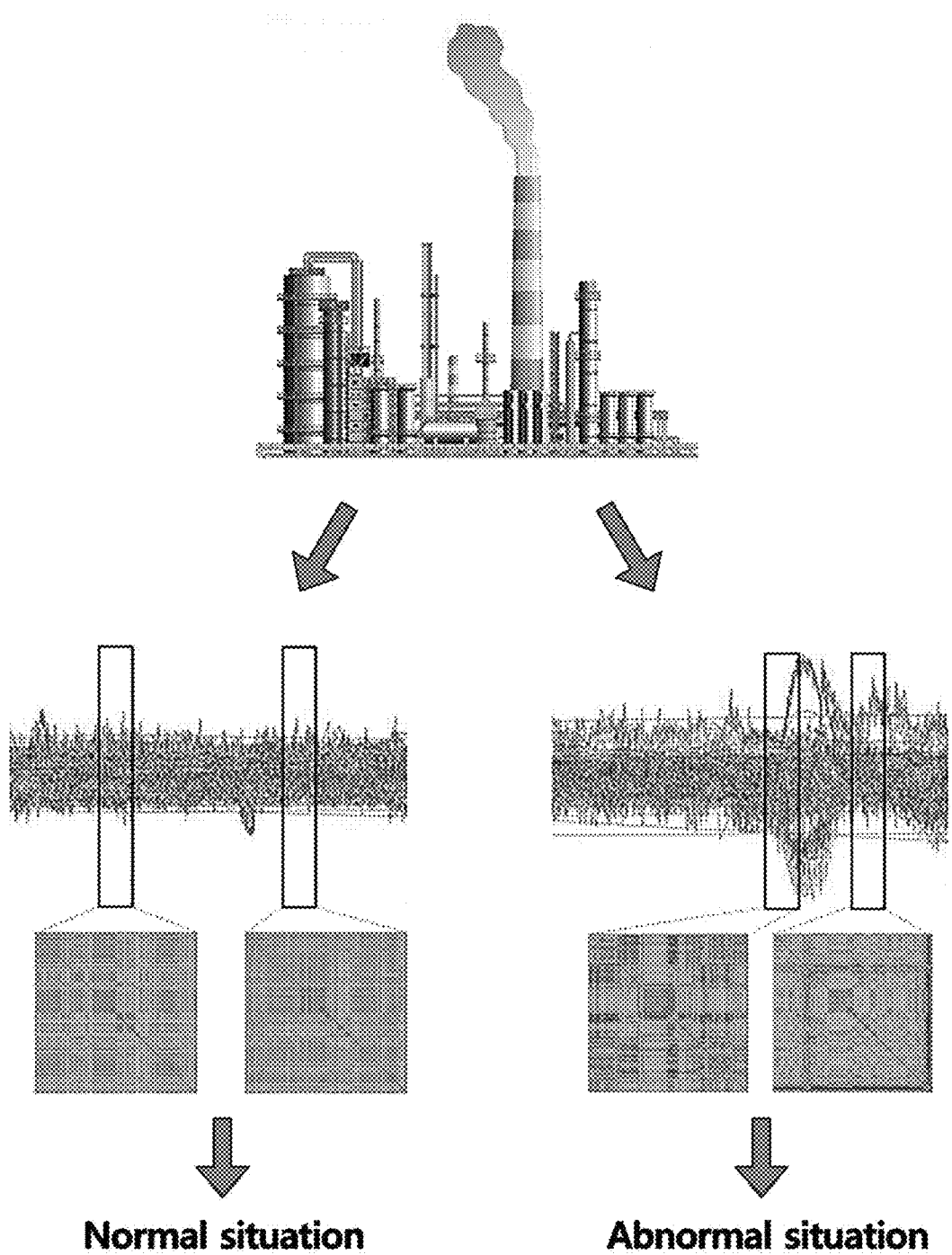
FIG. 1 is a schematic diagram illustrating the operation of a system for determining a situation of a facility according to an embodiment of the present disclosure.

FIG. 1 is a schematic diagram illustrating the operation of a system for determining a situation of a facility according to an embodiment of the present disclosure.

Referring to FIG. 1, the system 1 for determining a situation of a facility (hereinafter, the "facility situation determination system") determines if a situation of at least a part of the facility is abnormal by sensing and monitoring the internal situation of the facility through a plurality of sensors installed in the facility where a plurality of equipment is installed.

In an embodiment, the facility situation determination system 1 may generate a situation image at a query time by imaging sensing data acquired through the plurality of sensors; and determine if the query time corresponding to the situation image is in an abnormal situation by applying the situation image to a pre-learned situation determination model.

Additionally, when at least a part of the facility is determined to be in an abnormal situation, the facility situation determination system 1 may detect a location at which the abnormal situation is sensed.

Figure 2:
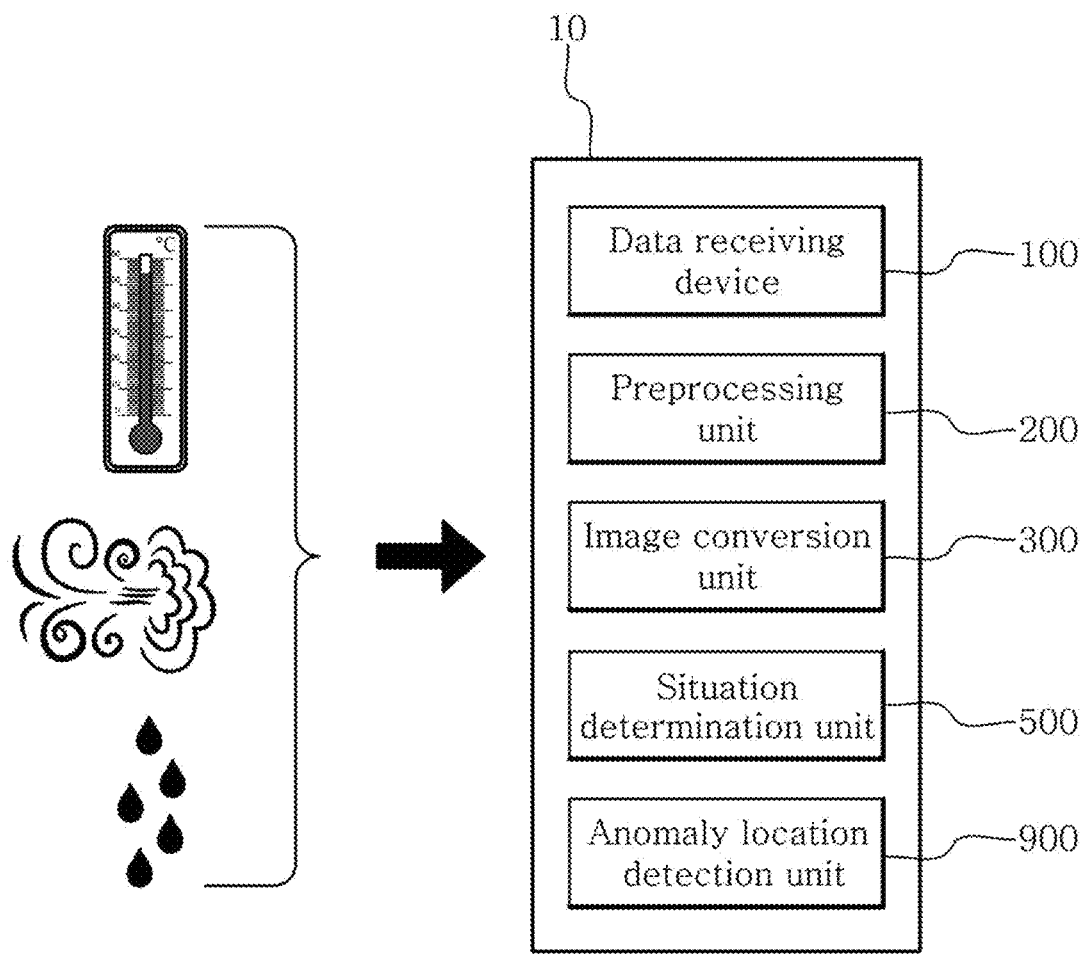
FIG. 2 is a schematic block diagram illustrating a system for determining a situation of a facility by imaging sensing data of the facility according to an embodiment of the present disclosure.

FIG. 2 is a schematic block diagram illustrating the system for determining a situation of a facility by imaging sensing data of the facility according to an embodiment of the present disclosure.

Referring to FIG. 2, the facility situation determination system 1 includes a receiving device 100 to receive sensing data through the plurality of sensors (not shown) installed in the facility; an image conversion unit 300 to generate a situation image showing the situation of the facility at the query time based on the sensing data; and a situation determination unit 500 to determine if an abnormal situation occurred at the query time by applying the situation image to a pre-learned situation determination model. In some embodiments, the facility situation determination system 1 may further include an anomaly location detection unit 900 configured to detect a location at which an abnormal situation occurred, when the situation of at least a part of the facility is determined to be abnormal.

The embodiments may have aspects of entirely hardware, entirely software, or partly hardware and partly software. For example, the facility situation determination system 1 may refer collectively to hardware capable of processing data and software that manages the hardware. The term "unit", "module", "device", or "system" as used herein is intended to refer to a combination of hardware and software that runs by the corresponding hardware. For example, the hardware may be a data processing device including a Central Processing Unit (CPU), a Graphic Processing Unit (GPU) or other processor. Additionally, the software may refer to a process being executed, an object, executable, a thread of execution and a program.

In an embodiment, the facility situation determination system 1 may be a computing device including a processor, electrically connected to the plurality of sensors. However, the facility situation determination system 1 is not limited thereto.

The receiving device 100 receives the sensing data used to monitor the situation of the facility and determine if an abnormal situation occurred through the plurality of sensors installed in the facility. The receiving device 100 is wired/wirelessly connected to the sensor and is configured to receive the sensing data. The receiving device 100 may use a variety of communication methods for communications between devices, and may include, for example, buses, contact pin connectors and wires. Alternatively, the receiving device 100 may be configured to receive data on at least one network through at least one network protocol.

The sensor includes a variety of sensors to acquire information about the operational situation of the facility (for example, the smart factory) and/or the surrounding situation (i.e., the situation of the facility). For example, the sensor may include a temperature sensor, a pressure sensor, a moisture sensor, a gravity sensor, a geomagnetic sensor, a motion sensor, a gyro sensor, an acceleration sensor, a slope sensor, a brightness sensor, an olfactory sensor, a depth sensor, a bending sensor, an audio sensor, an image sensor and a combination thereof.

The sensor is associated with equipment installed in the facility. In the specification, a single sensor may be associated with single equipment. Alternatively, a single sensor may be associated with at least one equipment. In this case, the single sensor senses the situation of an area at which the at least one equipment is located. Alternatively, multiple sensors may be associated with single equipment. In this case, the multiple sensors include at least one type of sensor.

The correlation between the sensor and the equipment may be stored in the facility situation determination system 1. In an embodiment, the correlation may be stored as a sensor table. The sensor table includes a sensor identifier, detailed information (for example, type) of the sensor, associated equipment, and a location in which the sensor is installed.

The sensor table may further include a facility operating sequence or a sensor sequence number.

At least one equipment in the facility may be designed to perform a series of operations in a sequential order. The design sequence may be referred to the facility operating sequence. Additionally, the sensor associated with respective equipment may have the sequence number. Here, the sequence number is associated with the order of operations between equipment that perform pre-designed operations in a sequential order. For example, when the facility operating sequence is set to operate first equipment earlier than second equipment, a first sensor associated with the first equipment has an earlier sequence number than a second sensor associated with the second equipment.

In an example, when the facility is a ventilation system of a thermoelectric power plant, the operation of the equipment according to the facility operating sequence may be performed in an order of the operation of a primary air fan (PAF), the operation of a Forced Draft Fan (FDF), the operation of a boiler (Furnace), the operation of a cooler (for example, GGH cooler), the operation of an Induced Draft Fan (IDF), and a desulfurization operation. In this case, the sensor associated with the primary air fan has the earliest sequence number (for example, No. 1), and subsequently, the sensor associated with the Forced Draft Fan (for example, No. 2), the sensor associated with the boiler, the sensor associated with the cooler, the sensor associated with the Induced Draft Fan, and the sensor associated with the desulfurization equipment have their sequence numbers in that order.

As such, the sequence number relies on the facility operating sequence. When the plurality of sensors is related to the same order of operations, the plurality of sensors has different arbitrary sequence numbers, but they has a larger value than the sequence number of the sensor related to the previous operation, and a smaller value than the sequence number of the sensor related to the next operation.

The sensing data is situation sensing result data of the facility by the plurality of sensors installed in the facility, and includes the query time and the sensing result. The sensing result may include various types of information according to the sensors. For example, the sensing result may be heat, temperature, humidity, pressure, image, audio, speed, location information or a combination thereof.

In an embodiment, the sensing data may be real-time sensing data. However, the sensing data is not limited thereto. For example, the sensing data may be sensing data at the time set by a user who wants to monitor. In some embodiments, the real-time sensing data may be sensing data per unit time.

The sensing data includes sensing data in the case of a normal situation and/or sensing data in the case of an abnormal situation (for example, a dangerous situation, a failure situation). Additionally, the sensing data acquired from the plurality of sensors includes sensing data sensed by each sensor.

In addition, when the receiving device 100 receives the sensing data, the receiving device 100 may further receive data related to the sensing data. The data related to the sensing data may include, for example, a sensor identifier, an equipment identifier and a sequence number.

In case that the facility situation determination system 1 receives the related data (for example, the sensor identifier), when the facility situation determination system 1 determines that an abnormal situation occurred, the sensor having sensed the abnormal situation may be detected using the related data and the stored sensor table.

In an embodiment, the facility situation determination system 1 may further include a preprocessing unit 200 to preprocess the sensing data received through the plurality of sensors.

The preprocessing unit 200 is configured to perform a denoising operation to remove noise from the sensing data. The denoising operation includes, for example, a Moving Average Filter, but is not limited thereto. The preprocessing unit 200 may remove large noise from the sensing data through the denoising operation.

Additionally, the preprocessing unit 200 may be configured to normalize the sensing data received through the plurality of sensors to have the same domain.

When at least one type of sensor is installed in the facility, the sensing data is multidimensional sensing data. The multidimensional sensing data may be represented as multivariate time-series data. For example, the sensing data sensed through the sensor may be represented as a graph over time for each sensor. Alternatively, the sensing data may be represented as an I×N matrix, where I denotes the time, and N denotes the number of sensors installed in the facility. The sensing data matrix includes sensing results sensed by each sensor at the time.

When the sensing data is multivariate time-series data, the sensing data is not defined in a single domain.

The preprocessing unit 200 normalizes the sensing data through various normalization methods, so that the sensing data received through the plurality of sensors, namely, the multivariate time-series data has the same domain. The domain normalization method may include, for example, min-max normalization, or z-normalization having the mean of 0 and the deviation of 1, but is not limited thereto.

The image conversion unit 300 is configured to generate a situation image at the requested time for situation determination (hereinafter referred to as Query Time (TQ)) based on the sensing data of the receiving device 100 or the preprocessed data of the preprocessing unit 200. The situation image is an image showing the situation of the facility.

The image conversion unit 300 determines the number of pixels included in the situation image depending on the number of sensors. For example, when N sensors are installed, the image conversion unit 300 forms an N×N pixel set to generate the situation image.

In an embodiment, the image conversion unit 300 may form the pixel set such that the pixels within the pixel set may be converted into coordinates by the sensor sequence number.

The image conversion unit 300 arranges the sensing data of each sensor according to the facility operating sequence (or the sensor sequence number).

As described above, the sensing data is multivariate time-series data, and is obtained through N sensors each exhibiting different physical properties (for example, temperature, humanity, pressure, etc.). The sensing data for each sensor may be received through the receiving device 100 in an arbitrary order. In this case, the sensing data of the receiving device 100 or the preprocessed data of the preprocessing unit 200 is arranged in an arbitrary order.

The image conversion unit 300 arranges the sensing data by the sequence number (for example, using the stored sensor table). The sensing data for each sensor is arranged in a sequential order by the sensor sequence number. For example, when N sensors are installed, the first sensor to the $N^{th}$ sensor are arranged in 1 row and N columns in a sequential order by the sensor sequence number according to the facility operating sequence. Additionally, the first sensor to the $N^{th}$ sensor may be arranged in N rows and 1 column.

Figure 3:
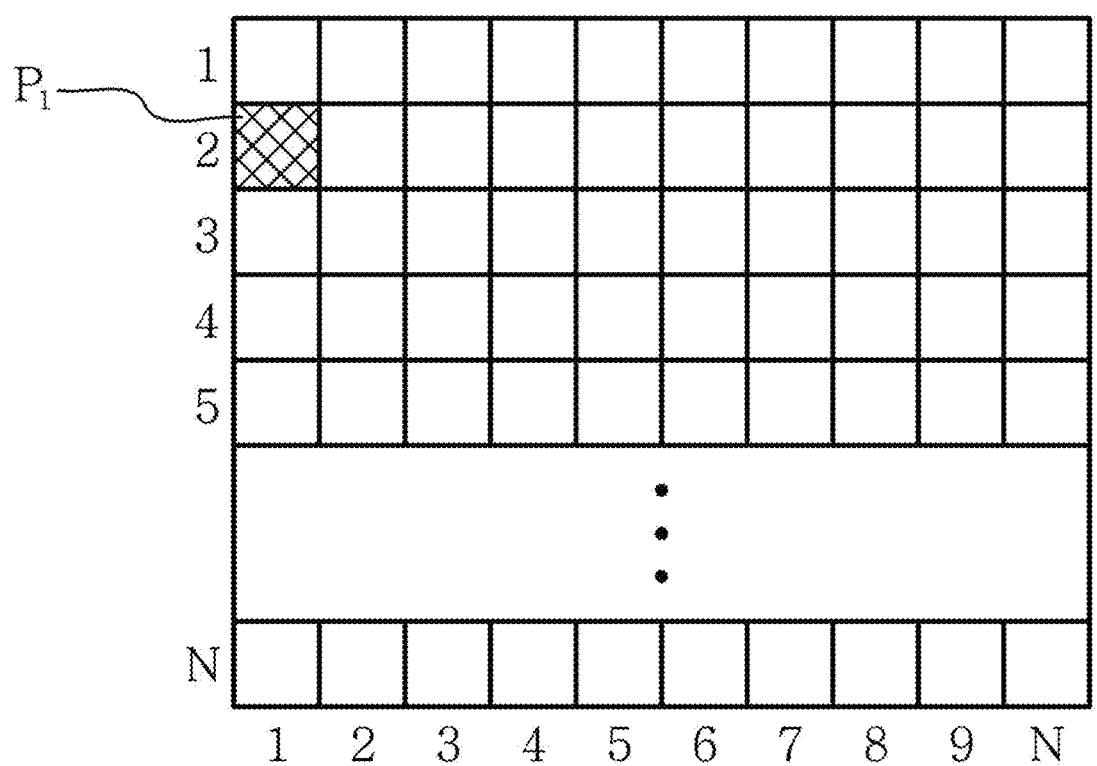
FIG. 3 is a diagram illustrating a pixel structure that constitutes a situation image according to an embodiment of the present disclosure.

FIG. 3 is a diagram illustrating the pixel structure that constitutes the situation image according to an embodiment of the present disclosure.

Referring to FIG. 3, the image conversion unit 300 forms an N×N pixel set based on 1 row and N columns and N rows and 1 column according to the sequence number. Each pixel within the pixel set is associated with the sensor sequence number, and eventually is associated with the sensor.

The pixels within the pixel set may be identified as 1, . . . , I, . . . , N horizontal coordinates and 1, . . . , j, . . . , N vertical coordinates, and eventually each pixel may be converted into coordinates (i, j). Here, each of i and j is an integer of 1 or greater and N or smaller, and they may have the same value.

For example, the pixel P1 of FIG. 3 may be associated with the first sensor and the second sensor, and may be converted into coordinates (for example, (1,2)) through the first and second sensors.

Due to the arrangement according to the sequence number, each pixel of the situation image is associated with the sensor, and each pixel included in the situation image including N×N pixels is converted into coordinates through the sequence number of the associated sensor. Additionally, the situation image may show the situation sensed by the sensor corresponding to each pixel.

The image conversion unit 300 forms the pixel set, and generates the situation image made of the pixels with colors.

In an embodiment, the image conversion unit 300 calculates a color value of the pixel, and determines a color corresponding to the calculated color value as the color of the pixel using a pre-stored color table.

In some embodiments, the color value of the pixel is calculated based on a difference of the sensing data of the associated sensor.

For example, when the sensor associated with the pixel is the $i^{th}$ sensor and the $j^{th}$ sensor, the color value $I_{i,j}$ of the pixel (i, j) may be calculated through the following Equation.

$$I_{i,j}=\|x_i-x_j\|$$ [Equation 1]

Here, $x_i$ denotes the sensing data of the $i^{th}$ sensor, and $x_j$ denotes the sensing data of the $j^{th}$ sensor.

Meanwhile, the pixel (i, i) in the situation image always has the color value of 0 irrespective of whether the situation is normal or not. Accordingly, unless the context clearly indicates otherwise, when a pixel in the situation image is mentioned herein, the embodiments of the present disclosure are described to the exclusion of (i, i).

The image conversion unit 300 searches the color table to find the color corresponding to the color value calculated by the above Equation 1, and determines the found color as the color of the corresponding pixel.

The image conversion unit 300 determines the color corresponding to the color value of each pixel using the pre-stored color table, and gives the determined color to the corresponding pixel.

The color table includes a color value scale and a color cluster. The color cluster may include at least some colors of a visible color model or an RGB color model (i.e., an RGB color family). However, the color cluster is not limited thereto and may include at least some colors of various color models (such as, for example, HSV, YCbCr, CMY). In another example, the color cluster may include all colors of a grey color model including white color and black color.

In some embodiments, the color of the color cluster may be represented as a continuous color. Here, continuity is represented by the standard for classifying the color model. For example, when the color cluster includes at least some colors of a grey color model, color continuity is represented by brightness. Alternatively, when the color cluster is a visible color model, color continuity may be differently represented depending on wavelength.

The image conversion unit 300 generates the situation image at the query time, and thus the color value may be referred to as the color value at the query time. In this case, the sensing data $x_1^{TQ}, x_i^{TQ}, \ldots, x_j^{TQ}, \ldots, x_n^{TQ}$ is each acquired from N sensors, and the image conversion unit 300 calculates each color value of each pixel using the sensing data $x_i^t$ of the $i^{th}$ sensor and the sensing data $x_j^t$ of the $j^{th}$ sensor at the query time, determines each corresponding color, and eventually generates the situation image including the color.

Additionally, to generate the situation image at a specific time (for example, the query time), the image conversion unit 300 may further use sensing data at the specific time and sensing data up to the past time having a predetermined time interval from the specific time.

That is, the situation image may be generated based on the sensing data at the current time and the past time.

The image conversion unit 300 calculates the color value of the pixel at the query time based on the sensing data (or the preprocessed data) at the time included in a predetermined time window d. Here, the time window d indicates a predetermined time interval from the query time to an arbitrary time in the past.

When sensing data at a single time (for example, the query time) is used in combination with sensing data accumulated before, it is possible to determine an abnormal situation more accurately than when only the sensing data at the single time is used. However, all past sensing data at every moment cannot be used as input due to the computational cost problem. To this end, the image conversion unit 300 is configured to use the sensing data at the current time t and the previous time (for example, t−1) included in the preset time window d.

The image conversion unit 300 uses the sensing data at the current time t and the previous time included in the time window d to generate the situation image at the current time t.

In an embodiment, the image conversion unit 300 calculates the color value of the pixel at each time included in the time window d based on the sensing data for each time included in the time window d; and calculates the color value of the pixel on the time window d by applying a time weight at each time to the color value at each time included in the time window d. In some embodiments, the color value of the pixel at each time may be calculated by the above Equation 1.

For example, the image conversion unit 300 calculates the color value $I_{i,j}^t, I_{i,j}^{t-1}, I_{i,j}^{t-2}, \ldots, I_{i,j}^{t-d+1}$ of the pixel at each time t, t−1, t−2, . . . , t−d+1 included in the time window d. The preset time weight $w_0, w_1, \ldots, w_{d-1}$ is applied to the color value of the pixel for each time. The image conversion unit 300 calculates the color value I of the pixel on the time window d based on a result of applying the weight for each time.

The importance of the sensing data for determining if an abnormal situation occurred at the query time is larger as it is closer to the query time. Accordingly, the time weight has a larger value as it is closer to the query time (for example, the current time t). For example, the time weight $w_0$ of the query time (for example, the current time t) has the largest value, and the time weight $w_{d-1}$ of the previous time that is earlier as much as the time window d than the query time, i.e., the most past time on the time window d, has the smallest value.

The time weight is set based on statistics of the sensing data by the corresponding sensor.

In an embodiment, the color value I of the pixel on the time window d is calculated through the following Equation.

$$I = w_0 \cdot I_{i,j}^t + w_1 \cdot I_{i,j}^{t-1} \ldots + w_{d-1} \cdot I_{i,j}^{t-d+1} \quad \text{[Equation 2]}$$

where $\Sigma_{k=0}^{d-1} w_k = 1$ and $w_0 > w_1 > \ldots > w_{d-1} \geq 0$

The image conversion unit 300 may generate the situation image further reflecting the sensing data at the previous time that is earlier as much as the time window d by determining the color corresponding to the color value of the pixel on the time window d as the color of the corresponding pixel.

There is almost no change in sensing data in a normal situation. Accordingly, when the situation image is generated based on sensing data of a normal situation, the color value of the situation image has a close color value (for example, corresponding to the same or similar color family). Accordingly, the situation image with each pixel having the same or similar color shows that the sensing data received through the plurality of sensors does not include sensing data of an abnormal situation.

On the contrary, there is a change in sensing data in an abnormal situation. Particularly, it is general that the change in sensing data is proportional to the extent of the abnormal situation. Accordingly, when the situation image is generated based on the sensing data including sensing data of an abnormal situation, the situation image has the color value having a large difference between at least some pixels and other pixel (for example, the color value corresponding to a different color family).

Accordingly, the situation image with at least some pixels having different color (for example, from color primarily in a normal situation image) shows that the sensing data received through the plurality of sensors includes sensing data of an abnormal situation. Accordingly, when the situation image is provided to the user, the user may recognize the fact that at least one sensor sensed the abnormal situation from the situation image.

As such, the situation image generated by the facility situation determination system 1 includes the sensing data from the past time as much as the predetermined time interval to the current time, and the location of each pixel is associated with the sensor. Accordingly, it is possible to determine if an abnormal situation occurred at the query time more accurately, and detect the sensor associated with the pixel having the color indicating the occurrence of the abnormal situation.

The facility situation determination system 1 includes the situation determination unit 500 to determine if an abnormal situation occurred in the facility at the query time by analyzing the situation image at the query time (for example, generated through the image conversion unit 300) to maximize the user's convenience.

The situation determination unit 500 determines if the situation image shows an abnormal situation by applying the situation image at the query time to the pre-learned situation determination model. When the situation image is generated using the sensing data including sensing data of the abnormal situation, the situation image showing the abnormal situation is determined, and eventually it is determined that the abnormal situation occurred in at least a part of the facility at the query time.

Figure 4:
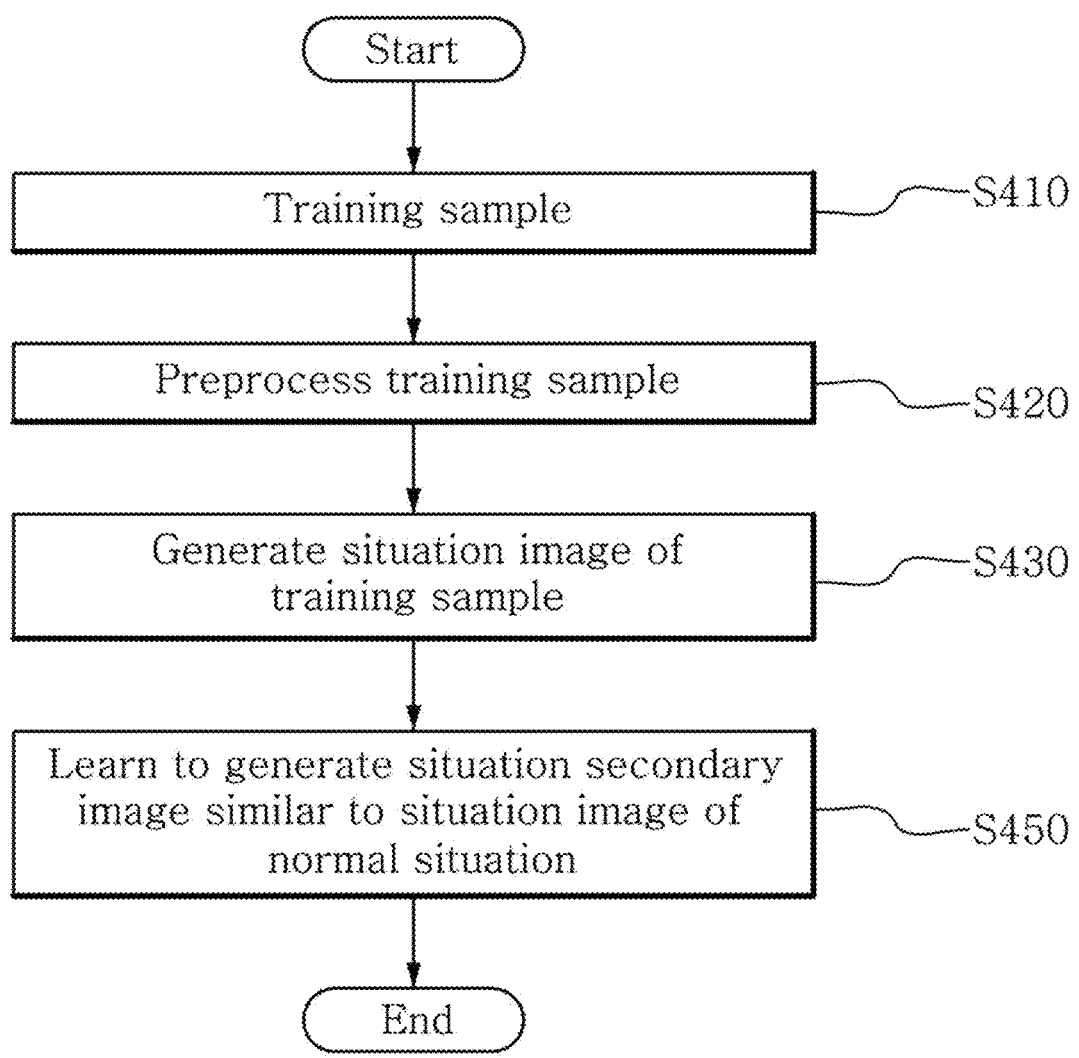
FIG. 4 is a flowchart illustrating a learning process of a situation determination model according to an embodiment of the present disclosure.

FIG. 4 is a flowchart illustrating the learning process of the situation determination model according to an embodiment of the present disclosure.

Referring to FIG. 4, the learning process of the situation determination model includes receiving a plurality of training samples (S410); preprocessing the plurality of training samples (S420); generating a situation image of the training samples (S430); and learning the situation determination model to generate a situation secondary image for determining a normal situation (S450).

In the step S410, each training sample includes sensing data of a normal situation. In an embodiment, each training sample may include a series of sensing data of a normal situation acquired during the normal operation of the facility for an arbitrary time.

In some embodiments, the sensing data of the training samples of the step S410 may undergo noise removal processing and/or normalization processing (S420). The preprocessed sensing data of the training samples is used to generate the situation image for learning.

The noise removal processing process and the normalization processing process are similar to the operation of the preprocessing unit 200 described above and its detailed description is omitted herein.

The situation image of the training samples is generated based on the sensing data of the step S410 (or the preprocessed data of the step S420). In some embodiments, when the image conversion unit 300 is configured to use the time window d, the situation image of the training samples is generated using the color value of the pixel on the time window d. The process of generating the situation image is similar to the operation of the image conversion unit 300 described above, and its detailed description is omitted herein.

In the step S450, the image generation ability of the situation determination model is learned. The situation determination model is a machine learning model that has an image generation structure including, for example, Auto- Encoder (AE), Variational Auto-Encoder (VAE) and Generative Adversarial Network (GAN), and generates an image based on data of a normal situation.

Figure 5:
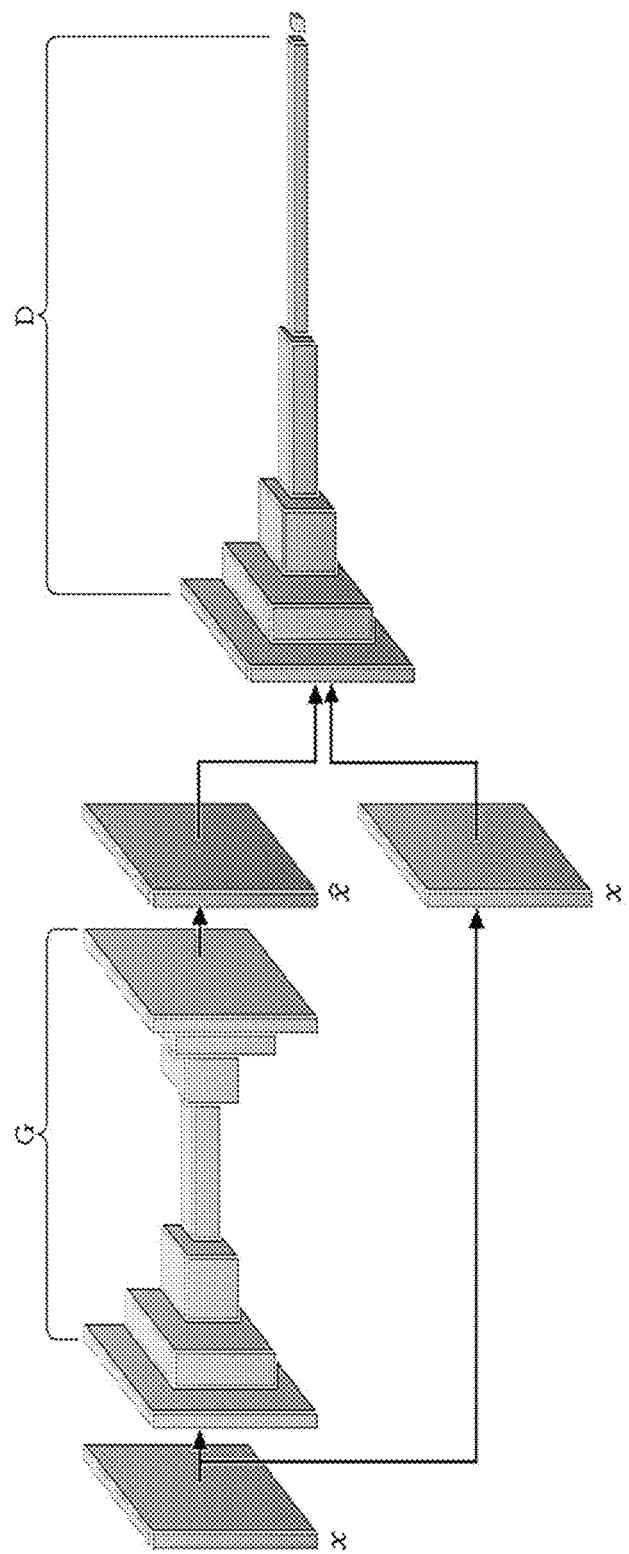
FIG. 5 is a conceptual diagram of a situation determination model structure according to an embodiment of the present disclosure.

FIG. 5 is a conceptual diagram of the situation determination model structure according to an embodiment of the present disclosure.

Referring to FIG. 5, the situation determination model may be modeled with a GAN structure. The situation determination model of FIG. 5 includes a generator G and a discriminator D. The generator is configured to output new data by applying noise to input data. In some embodiments, the generator has an encoder-decoder structure using skip connection.

The generator is aimed at generating data that is so close to real data to deceive the discriminator, so that the close data is determined to be real data. The discriminator is aimed at identifying the real data and the output data of the generator.

When learning progresses, the generator and the discriminator update the parameters in the model to achieve each goal. The discriminator is learned to reduce the probability of making mistakes, and the generator is learned to increase the probability that the discriminator makes a mistake on data outputted from arbitrary noise. That is, the generator and the discriminator are learned to solve the minimax problem. The learning process for solving the minimax problem is disclosed by Non-Patent Literature 1 (Goodfellow, Ian J.; Pouget-Abadie, Jean; Mirza, Mehdi; Xu, Bing; Warde-Farley, David; Ozair, Sherjil; Courville, Aaron; Bengio, Yoshua (2014). "Generative Adversarial Networks"), and its detailed description is omitted herein.

In this learning process, the discriminator receives a feedback from a right answer of the input value (i.e., training data), and the generator receives the feedback from the discriminator. As the sufficiently learned generator is configured to output data that is close to the input data to the maximum extent, the generator is configured to output data that is close to the input data to the maximum extent. Here, the close output data is, for example, data having a minimum vector distance with a situation image showing a normal situation.

In an embodiment, to learn the situation determination model, the normal situation image is only used for the input data for learning and the real data for the discriminator. The generator learns various distributions of normal ranges of normal situation images (for example, a color distribution of pixels). In this instance, the generator is learned to generate a similar image that is so real to deceive the discriminator. Additionally, the generator is further learned for a minimum reconstruction error of the input image and the generated image.

For example, the generator is learned to solve the following objective function L.

$$L = L_{GAN}(G, D) + L_{rec}(x - G(x))$$ [Equation 3]

The objective function is a combination of a GAN loss function $L_{GAN}$ and a reconstruction loss function $L_{rec}$. The GAN loss function is a function for solving the minimax problem disclosed by Non-Patent Literature 1. The reconstruction loss function is a function for the generator to solve the minimum reconstruction error between the input image and the generated image. For example, the reconstruction loss function may be represented as $L_1(x) = \|x\|$, $L_2(x) = \|x\|_2^2$.

Since the situation determination model including the learned generator learns the distribution of sensing data of the training samples, when the requested data for situation determination (for example, the situation image at the query time) is inputted, the situation determination model outputs the generated image belonging to the data distribution of training sample or having a minimum reconstruction error with the data distribution.

The new image generated by the situation determination model plays a role in assisting the situation image primarily used to determine a normal situation, and may be thus referred to as a situation secondary image. As described above, when the generator is learned, the situation secondary image that is very close to the situation image showing a normal situation is generated.

Accordingly, when the query image is a normal situation image, the learned situation determination model generates an output image that is almost the same as the input image. For example, the situation secondary image that is very close to the situation image showing a normal situation is generated.

On the contrary, when the query image is an abnormal situation image, an output image having a data distribution having a smallest error with the input image (based on the pre-learned normal data distribution) is generated. For example, a region showing the abnormal situation (for example, the pixel associated with the sensor having sensed the abnormal sensing data) is changed to and outputted in a color having a distance that is closest to a region showing the normal situation. As described above, in the case of the normal situation, the situation determination model is learned to calculate a low color value. That is, the color value of the pixel associated with the sensor having sensed the abnormal situation reduces within the situation secondary image of the situation image showing the abnormal situation.

As a result, comparing with the situation image of the abnormal situation, the situation secondary image having a difference in the region showing the abnormal situation is outputted. It will be described in more detail with reference to the anomaly location detection unit 900 below and FIG. 12.

The situation determination model is performed by the computing device including the processor. For example, the situation determination model may be learned by the facility situation determination system 1, or may be learned by an external computing device and provided to the facility situation determination system 1.

Referring back to FIG. 2, the situation determination unit 500 generates a secondary image (i.e., the situation secondary image) of the situation image by applying the situation image to the pre-learned situation determination model, and calculates an anomaly score based on the situation image and the situation secondary image. The anomaly score is a numerical representation indicating the abnormal extent of the situation at the query time of the sensing data used to generate the situation image.

In an embodiment, the situation determination unit 500 calculates an anomaly score based on a difference between the situation image and the situation secondary image.

For example, the situation determination unit 500 calculates the anomaly score through the following Equation.

$$\text{Anomaly score}(Q) = \|Q - G(Q)\|_2$$ [Equation 4]

Here, Q denotes the situation image, and G(Q) denotes the situation secondary image generated through the situation determination model (for example, the generator of FIG. 5).

In some embodiments, when the situation determination model is the model of FIG. 5, the anomaly score is calculated based on a difference between feature vectors f outputted for the situation image and the situation secondary image inputted to the discriminator D. For example, the situation determination unit 500 may calculate the anomaly score through the following Equation.

$$\text{Anomaly Score}(Q) = \|f(Q) - f(G(Q))\|_2 \qquad \text{[Equation 5]}$$

Here, f denotes the feature vector outputted from the discriminator of the situation determination model.

The calculated anomaly score indicates a normal situation as it is closer to 0, and indicates an abnormal situation as it is larger.

The situation determination unit 500 determines if an abnormal situation occurred in the facility at the time when the situation image used to calculate the anomaly score is sensed, by comparing the anomaly score and a preset threshold. The abnormal situation determination of the situation determination unit 500 is not limited to the occurrence of the abnormal situation in the whole facility, and includes occurrence of the abnormal situation in only a part of the facility (for example, a specific single site).

The threshold is an arbitrary value that is higher than the anomaly score indicating a normal situation. The threshold is set based on the type of the facility, the characteristics of equipment installed in the facility (for example, importance of the order of operations associated with equipment, and in emergency, the presence or absence of alternative equipment), and statistics of the abnormal situation based on the sensing data.

When the anomaly score is equal to or less than the threshold, the situation determination unit 500 determines as a normal situation. Subsequently, the situation determination unit 500 keeps monitoring the situation of the facility.

Meanwhile, when the anomaly score is larger than the threshold, the situation determination unit 500 determines as an abnormal situation. In some embodiments, the facility situation determination system 1 may perform operation(s) preset to be performed in an abnormal situation (for example, through the situation determination unit 500). The operation in the abnormal situation includes, for example, a caution, a warning, an abnormal situation occurrence notification to the user, and performing an emergency process.

Additionally, the situation determination unit 500 may be further configured to use at least one threshold to determine the situation of the facility. For example, the threshold includes first to third thresholds, and the third threshold is used to provide an abnormal situation notification, the second threshold is used to provide a warning, and the first threshold is used to provide a caution. The third threshold has the highest anomaly score, and the first threshold has the lowest anomaly score. The second threshold has a value between the first threshold and the third threshold.

When it is determined that an abnormal situation occurred, the anomaly location detection unit 900 is configured to detect a location at which the abnormal situation occurred. The location at which the abnormal situation occurred is detected based on the location of the sensor having sensed the corresponding abnormal situation.

The occurrence location includes the location of the sensor corresponding to the sensing data indicating the abnormal situation, and the location of equipment associated with the sensor.

In an example, the location at which the abnormal situation occurred may be detected as the location of the sensor having sensed the corresponding abnormal situation. In another example, the location at which the abnormal situation occurred may be detected as an area corresponding to the sensing range of the sensor having sensed the corresponding abnormal situation.

In an embodiment, the anomaly location detection unit 900 may generate a residual image at the query time based on the situation image at the query time and the situation secondary image at the query time, and detect the location of the sensor having sensed the corresponding abnormal situation based on the color of the pixel included in the residual image.

The residual image is generated by calculating a residual between the situation image and the situation secondary image. Unless the residual image is used, when all sensors sense an abnormal situation, it is difficult to accurately identify the location at which the abnormal situation occurred. When all sensors sense an abnormal situation, the residual image makes it possible to identify the location at which the abnormal situation occurred.

In an example, the residual image may be calculated through the following Equation.

$$\text{Residual image} = |Q - G(Q)| \qquad \text{[Equation 6]}$$

In another example, the residual image may be generated by a difference between the color value of the pixel included in the situation image and the color value of the pixel included in the situation secondary image, calculated for each pixel.

As described above, the situation secondary image is generated by the situation determination model learned to generate an image that is close to a normal situation to the maximum extent. Accordingly, when the situation image showing a normal situation is inputted to the model, the situation secondary image causes a result having no or least residual if any. As a result, when all sensing data indicates a normal situation, a difference between the pixels of the situation image and the situation secondary image is small, and thus the color value is very small. Accordingly, all or most areas in the residual image are in the same or similar colors (or color family). Here, the same or similar colors are in the color family corresponding to the color value that is close to 0. The residual image shows the anomaly score that is close to 0.

On the contrary, when the sensing data includes sensing data of an abnormal situation, the situation secondary image has a difference in the pixel associated with the sensor having sensed the abnormal situation. This is because the color value of the pixel was converted close to a normal situation.

Accordingly, the residual image between the abnormal situation image and its situation secondary image has a residual in the pixel. For example, when the sensing data at the query time includes data having abnormality detected by the $n^{th}$ sensor, the $n^{th}$ row and the $n^{th}$ column (except (n, n)) in the residual image acquired through the situation image and the situation secondary image at the query time have a large color value. Accordingly, the $n^{th}$ row and the $n^{th}$ column (except (n, n)) have color not corresponding to the color value of 0.

That is, the data distribution of the residual image in the abnormal situation may be divided into data of pixels associated with the sensor having sensed the abnormal situation and data of pixels that did not do so.

In some embodiments, when the color value of the pixel of the residual image is larger than a residual threshold, it may be determined as pixel associated with the sensor having sensed the abnormal situation. The residual threshold indicates a relatively large value that is not generated in the case of the normal situation. The pixel having a larger color value than the residual threshold is associated with the sensor having sensed the abnormal situation.

The pixel associated with the sensor having sensed the normal situation and the pixel associated with the sensor having sensed the abnormal situation have different colors. As described above, as the pixel is associated with the sensor, eventually, the pixel having a different color from the color of the residual image in the normal situation within the residual image (i.e., the pixel having a larger color value than the residual threshold) may be detected, and the sensor having sensed the abnormal situation may be discovered by determining the sequence number of the sensor associated with the detected pixel.

It will be obvious to those skilled in the art that the determination system 1 may include other elements not described herein. For example, the facility situation determination system 1 may include other hardware components necessary for the operation described herein, including a network interface, an input device for data entry, a display, a printer or other output device for displaying data, and a storage device (for example, memory) to store data or information required to carry out the embodiments.

A method for determining a situation of a facility according to another aspect of the present disclosure may be performed by the computing device including the processor (for example, the facility situation determination system 1).

Figure 6:
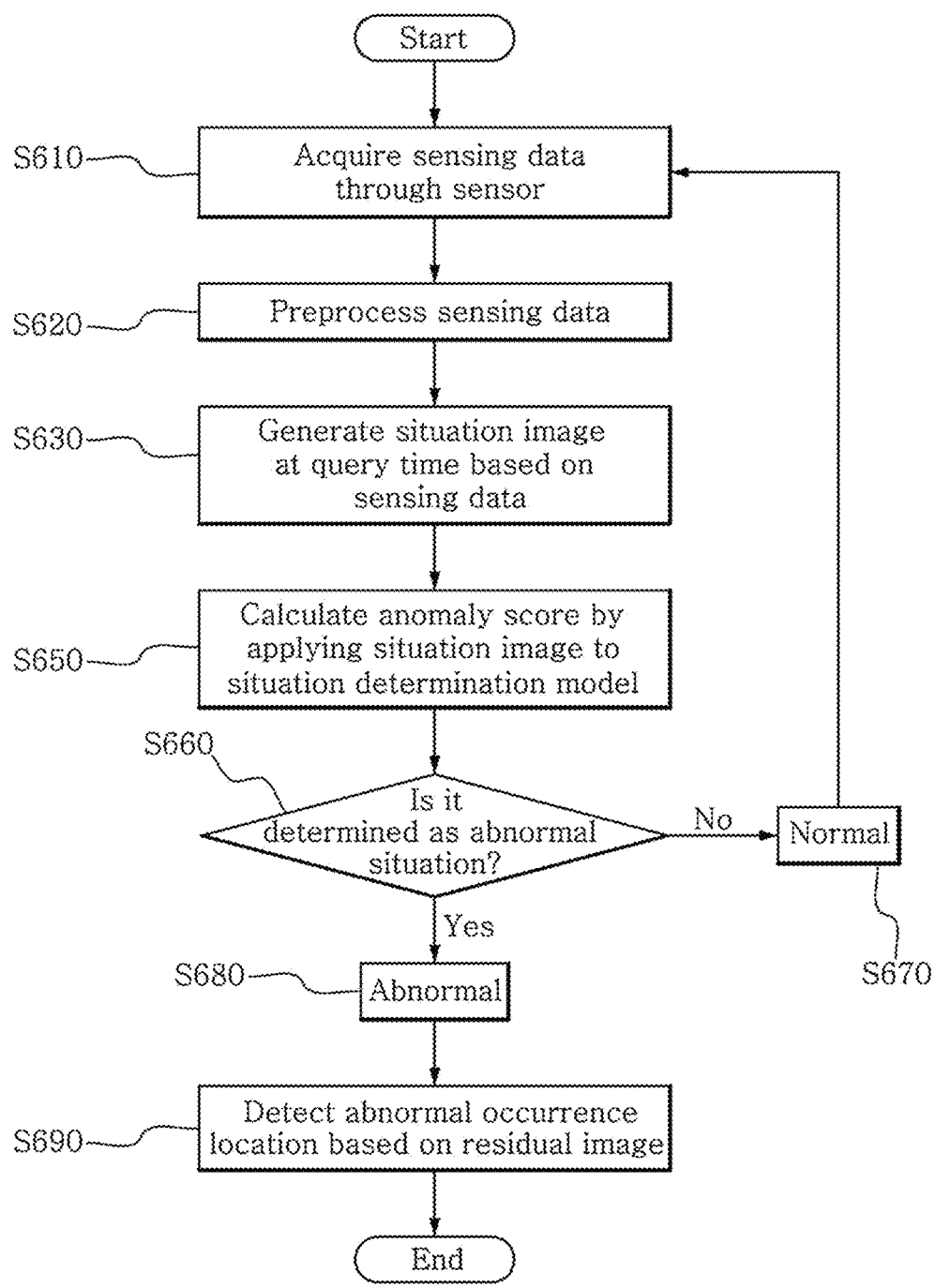
FIG. 6 is a flowchart of a method for determining a situation of a facility according to an embodiment of the present disclosure.

FIG. 6 is a flowchart of the method for determining a situation of a facility according to an embodiment of the present disclosure.

Referring to FIG. 6, to determine the situation of the facility at the query time, first, sensing data is received (for example, by the receiving device 100) through the plurality of sensors installed in the facility (S610). According to the type of the plurality of sensors, the sensing data may be multivariate time-series data. The plurality of sensors includes $i^{th}$ and $j^{th}$ sensors.

In some embodiments, the sensing data received in the step S610 may further include sensing data at the earlier time than the query time.

In an embodiment, the received sensing data may be preprocessed (for example, by the preprocessing unit 200) (S620). In an embodiment, the preprocessing step (S620) includes normalizing the sensing data and/or removing noise from the sensing data.

For example, when the sensing data of the step S610 is multivariate time-series data, each having different data ranges, the sensing data may be normalized through z-normalization having the mean of 0 and the deviation of 1 to compare sensing data of different ranges in the same distribution. Additionally, large noise may be removed from the normalized sensing data through a Moving Average Filter.

Subsequently, a situation image of the sensing data at the query time t is generated (for example, by the image conversion unit 300) (S630). The situation image includes an image showing the situation of the facility in real time or at a specific time requested by the user. Here, the real-time situation image includes a situation image per unit time.

In an embodiment, the step of generating the situation image (S630) includes determining a plurality of pixels of the situation image based on the number of sensors. When N sensors are installed, the sensing data is converted into an image having N×N pixels (for example, for each unit time).

Each pixel is associated with the $i^{th}$ and $j^{th}$ sensors, but the $i^{th}$ sensor and the $j^{th}$ sensor may be the same sensor.

In some embodiments, the step of determining the plurality of pixels includes arranging the sensing data of the sensors (or preprocessed data) according to a preset facility operating sequence. In this case, the pixel may be converted into coordinates by the sensor sequence number according to the facility operating sequence.

Additionally, the step S630 further includes determining the color of each pixel based on the sensing data of the associated $i^{th}$ and $j^{th}$ sensors.

In some embodiments, the step of determining the color of each pixel at the query time t includes calculating a color value of the pixel by calculating a difference between the sensing data of the $i^{th}$ and $j^{th}$ sensors; and determining color corresponding to the calculated color value using a pre-stored color table, and giving the determined color to the corresponding pixel. The determination of the color may be performed using the pre-stored color table.

In some embodiments, the difference between the sensing data of the $i^{th}$ and $j^{th}$ sensors may be calculated through the above Equation 1.

In an embodiment, the situation image is calculated using sensing data up to the previous time having a predetermined time interval on the basis of the query time (S630). The predetermined time interval may be referred to as a time window d.

In this case, sensing data at the time included in the time window is received at the step S610. In some embodiments, the sensing data at the time included in the time window is preprocessed (S620).

In the embodiment, to generate the situation image based on the sensing data at the time included in the time window, the color value of the pixel on the time window is calculated as the color value of the pixel at the query time.

In some embodiments, determining the color value of the pixel on the time window includes calculating the color value of the pixel at each time included in the time window d based on the sensing data for each time included in the time window d; and calculating the color value of the pixel on the time window d by applying a time weight at each time to the color value at each time included in the time window d. Here, the color value of the pixel at each time included in the time window may be calculated by the above Equation 1.

In some embodiments, the result of applying the time weight for calculating the color value of the pixel on the time window may be calculated by a weighted averaging method, represented through the above Equation 2.

After the step S630, a situation secondary image is generated by applying the situation image to the pre-learned situation determination model, an anomaly score is calculated based on the situation image and its situation secondary image (S650), and determination as to whether an abnormal situation occurred in the facility at the query time is made by comparing the calculated anomaly score at the query time and a preset threshold (S660) (for example, by the situation determination unit 500).

Additionally, when it is determined as an abnormal situation (S680), the determination method may further include detecting a location at which the abnormal situation occurred (S690).

In an embodiment, the step of detecting the location at which the abnormal situation occurred (S690) includes generating a residual image at the query time based on the situation image and the situation secondary image at the query time; determining a pixel having a larger color value than a preset residual threshold based on the color value of the pixel included in the residual image; determining a sensor associated with the determined pixel; and detecting the location of the determined sensor. The associated sensor is detected as the sensor having sensed the abnormal situation.

Hereinafter, the operation of the step (S630 to S690) when the sensing data is in a normal situation will be described in detail with reference to FIGS. 7 to 9, and the operation of the step (S630 to S690) when the sensing data is in an abnormal situation will be described in detail with reference to FIGS. 10 to 12.

Figure 7:
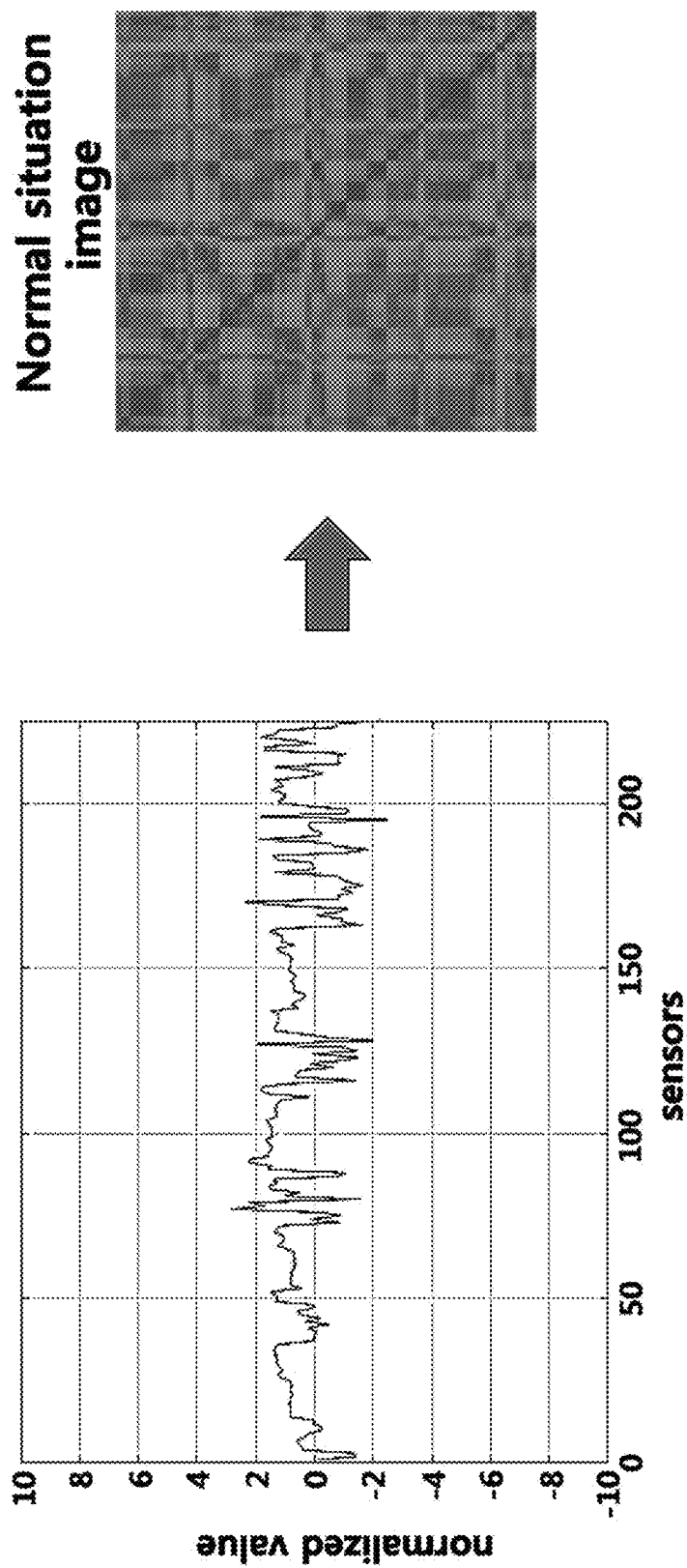
FIG. 7 is a diagram illustrating a normal situation image according to an embodiment of the present disclosure.

FIG. 7 is a diagram illustrating a normal situation image according to an embodiment of the present disclosure.

When the sensing data received through the plurality of sensors includes sensing data of a normal situation, a normal situation image is generated (S630).

Referring to FIG. 7 showing the preprocessed sensing data for each sensor in the form of a graph, in the normal situation, there is almost no change in the sensing data received through the plurality of sensors. For example, as shown in FIG. 7, a distribution of sensing data has a relatively narrow sensor value range.

Accordingly, a distribution of color values of pixels based on a difference of the sensing data of the $i^{th}$ sensor and the sensing data of the $j^{th}$ sensor has a relatively narrow range, and eventually the situation image (i.e., the normal situation image) showing the normal situation is made of pixels having the same or similar family of colors. For example, as shown in FIG. 7, the situation image including pixels having colors of blue color family is generated.

Figure 8:
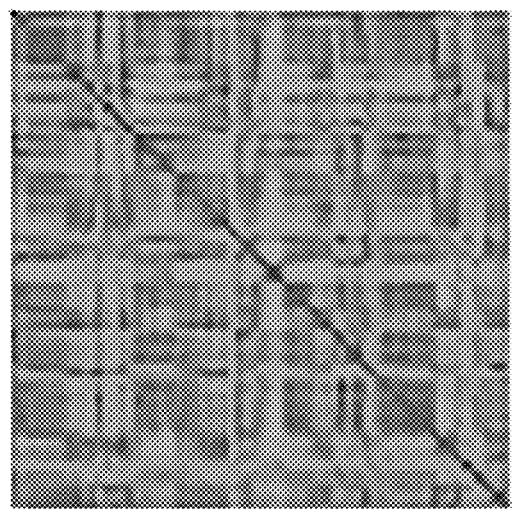
FIG. 8 is a diagram illustrating a situation secondary image generated from the situation image of FIG. 7.

FIG. 8 is a diagram illustrating a situation secondary image generated from the situation image of FIG. 7.

In the step S630, when the situation image at the query time is generated, a situation secondary image at the query time is generated by applying the situation image to the pre-learned situation determination model (S650).

As described above, the situation determination model (for example, the generator of FIG. 5) learned using the sensing data of the normal situation is configured to generate output data having a data distribution of the normal situation (for example, a color value distribution of the normal situation).

When the query image is a normal situation image, the learned situation determination model is configured to generate the situation secondary image that is close to the normal situation image.

For example, when the normal situation image of FIG. 7 is inputted to the situation determination model, the situation secondary image that is close to the normal situation image of FIG. 7 is generated as shown in FIG. 8.

Figure 9:
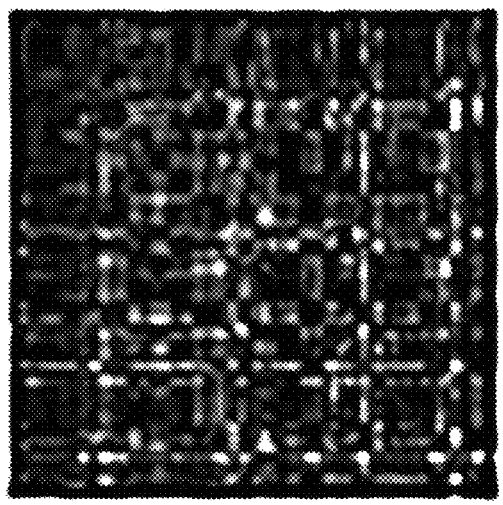
FIG. 9 is a diagram showing a residual image based on the normal situation image of FIG. 7 and the situation secondary image of FIG. 8.

Additionally, an anomaly score at the query time QT, calculated based on the normal situation image of FIG. 8 and its corresponding situation secondary image of FIG. 9 is calculated below the threshold for determining an abnormal situation by comparison with the threshold.

FIG. 9 is a diagram showing a residual image based on the normal situation image of FIG. 7 and the situation secondary image of FIG. 8.

The normal situation image and its situation secondary image have relatively similar data distributions. Accordingly, the residual image based on the normal situation image and its situation secondary image has a color value of pixel of 0 or a very low value. As a result, for example, when a color table including information corresponding to the black color family having the color value of 0 is used, most of the pixels of the residual image have black color as shown in FIG. 9.

Figure 10:
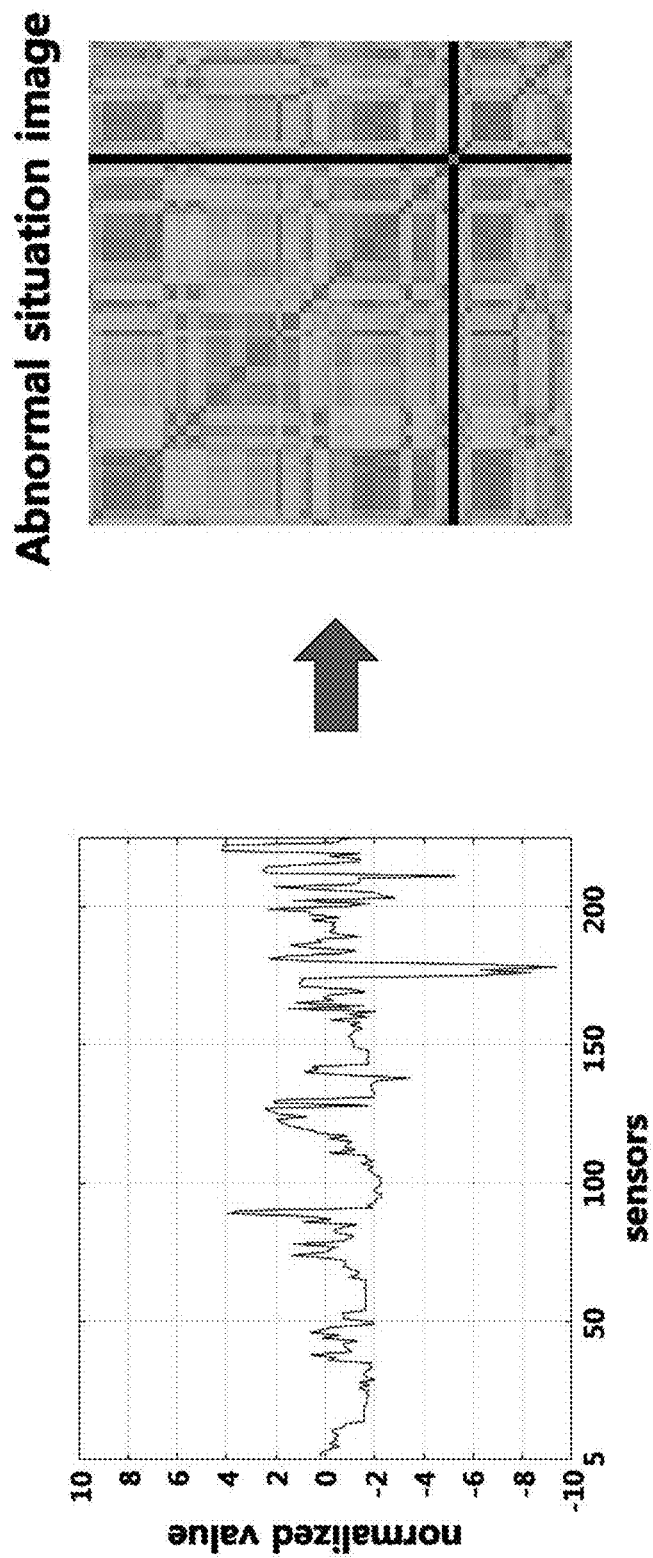
FIG. 10 is a diagram showing an abnormal situation image according to an embodiment of the present disclosure.

FIG. 10 is a diagram showing an abnormal situation image according to an embodiment of the present disclosure.

In the graph of sensing data of FIG. 10, the sensor of the sensor sequence number between 170 and 180 (for example, #175) senses sensing data that is distinctly different from sensing data of a normal situation.

When the sensing data of the query time includes sensing data of an abnormal situation, an abnormal situation image is generated (S630).

A distribution of sensing data is also different from the distribution of sensing data of the normal situation shown in FIG. 7. Accordingly, a relatively large difference occurs between the sensing data of the sensor having sensed the abnormal situation and the sensing data of the sensor having sensed the normal situation. For example, as shown in FIG. 10, when going through z-normalization, the sensing data of the sensor having sensed the abnormal situation has a data distance far away from the sensing data of the sensor having sensed the normal situation. Eventually, the pixels associated with the sensor having sensed the abnormal situation have a different color value from the pixels associated only with the sensor having sensed the normal situation.

Eventually, as shown in FIG. 10, the pixels in the $175^{th}$ row and the $175^{th}$ column (except (175,175) pixel), associated with the sequence number 175 have yellow color indicating a relatively large color value.

Figure 11:
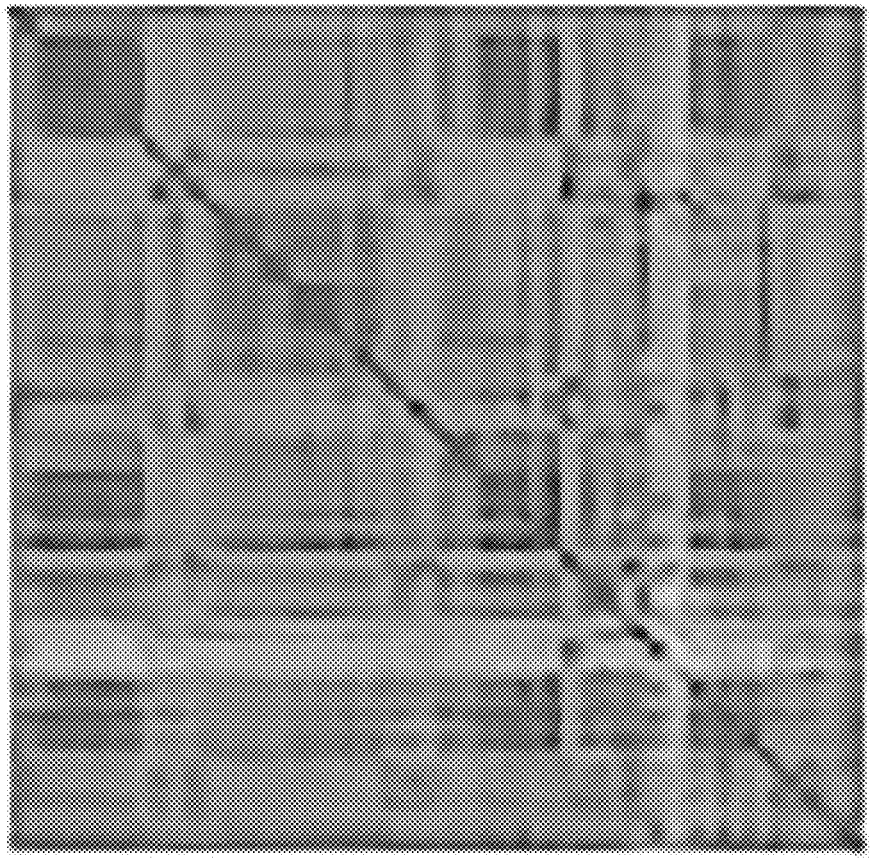
FIG. 11 is a diagram showing a situation secondary image generated from the situation image of FIG. 10.

FIG. 11 is a diagram showing a situation secondary image generated from the situation image of FIG. 10.

When the situation image of the query time is generated in the step S630, a situation secondary image at the query time is generated by applying the situation image to the pre-learned situation determination model (S650).

Due to the above-described characteristics of the generator, when the query image is an abnormal situation image, the learned generator generates an output image having a data distribution having a smallest error with input image (on the basis of pre-learned normal data distribution). Accordingly, the color value of the pixel associated with the sensor having sensed the abnormal situation within the situation secondary image is smaller than the color value of the pixel associated with the sensor having sensed the abnormal situation within the abnormal situation image.

When the situation image of FIG. 10 is applied to the situation determination model, as shown in FIG. 11, the situation secondary image having the color of the pixel associated with the $175^{th}$ sensor, changed from yellow color to a color closer to blue color, is outputted. As described above, the color value of the blue color is lower than the color value of the yellow color.

Additionally, an anomaly score at the query time QT, calculated based on the abnormal situation image of FIG. 10 and the situation secondary image of FIG. 11 has a larger value than the threshold for determining an abnormal situation.

Figure 12:
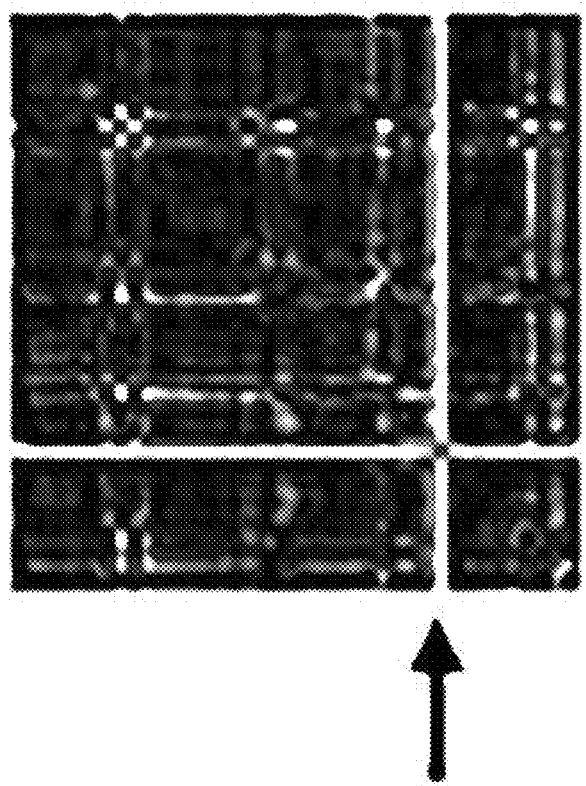
FIG. 12 is a diagram showing a residual image based on the abnormal situation image of FIG. 10 and the situation secondary image of FIG. 11.

FIG. 12 is a diagram showing a residual image based on the abnormal situation image of FIG. 10 and the situation secondary image of FIG. 11.

The abnormal situation image and the situation secondary image have a color value having a relatively large difference in the pixel associated with the sensor having sensed the abnormal situation. Accordingly, the residual image has a relatively large difference in color value between the pixel associated with the sensor having sensed the abnormal situation and the pixel associated with the sensor having not sensed the abnormal situation, and thereby has a distinguishable color.

For example, the pixels in the $175^{th}$ row and the $175^{th}$ column (except the (175, 175) pixel) within the residual image has a relatively large color value. In some embodiments, the relatively large color value may be a larger value than the residual threshold.

When the pixel associated with the sensor having sensed the abnormal situation is determined based on the color value (or the color), the sequence number of the sensor having sensed the abnormal situation may be calculated based on the row and the column of the determined pixel, and eventually, the location of the sensor having sensed the abnormal situation may be detected. For example, in FIG. 12, the pixels in the 175$^{th}$ row and the pixels in the 175$^{th}$ column (except the (175, 175) pixel) are determined as the pixel associated with the sensor having sensed the abnormal situation. Thus, 175 is calculated as the sequence number of the sensor having sensed the abnormal situation, and the location at which the abnormal situation occurred is detected based on the location of #175 sensor.

As above, using the system 1 and method for determining a situation of a facility, it is possible to determine if an abnormal situation occurred by using multivariate time-series data acquired through two or more types of sensors.

Additionally, when it is determined as an abnormal situation, it is possible to detect the location of the sensor having sensed the abnormal situation or the location at which the abnormal situation occurred, by generating the residual image based on the situation image and the situation secondary image generated from the situation image.

The operation of the system 1 and method for determining a situation of a facility by imaging sensing data of the facility according to the embodiments as described above may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of devices for identifying records in which computer-readable data is stored. Examples of the computer-readable recording medium include read only memory (ROM), random access memory (RAM), compact disc read only memory (CD-ROM), magnetic tape, floppy disk, and optical data storage and identification devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

In Republic of Korea, from 2009 to June 2015, damage caused by failures in publicly own power plants amounts to approximately KRW 1,400 billions, and damage caused by failures in privately own power plants amounts to approximately KRW 260.6 billions.

The system for determining a situation of a facility by imaging sensing data of the facility according to an aspect of the present disclosure may determine the situation more accurately based on local connectivity of multivariate time-series data by imaging of the multivariate time-series data through the situation determination model modeled using one of the fourth industrial innovation technologies, machine learning.

Accordingly, it is expected that the system will prevent a huge loss in terms of economy and resources.

What is claimed is:

1. A method for determining a situation of a facility by imaging a sensing data of the facility, performed by a computing device including a processor, the method comprising:
   receiving sensing data through a plurality of sensors at a query time;
   generating a situation image at the query time, showing the situation of the facility at the query time based on the sensing data, wherein generating the situation image comprises:
      arranging the sensing data of each sensor at the query time; and
      forming an N*N pixel set, wherein N is a total number of sensors in the plurality of sensors and each pixel is associated with a first sensor and a second sensor; and
   determining if an abnormal situation occurred at the query time by applying the situation image to a pre-learned situation determination model.

2. The method according to claim 1, wherein the plurality of sensors has a plurality of types, and
   the sensing data is multivariate time-series data.

3. The method according to claim 1, further comprising:
   preprocessing to normalize the sensing data before generating the situation image.

4. The method according to claim 1, wherein arranging the sensing data of each sensor at the query time comprises:
   arranging according to a pre-stored sensor sequence number, and
   the sensor sequence number is in accordance with an operating sequence of equipment in the facility.

5. The method according to claim 1, wherein generating the situation image comprises:
   calculating a color value of a pixel at the query time, based on a difference between first sensing data and second sensing data at the query time, received through a first sensor and a second sensor associated with the pixel;
   searching for a color corresponding to the calculated color value in a pre-stored color table; and
   assigning the color corresponding to the calculated color value as the color of the pixel.

6. The method according to claim 5, wherein calculating the color value of the pixel at the query time further comprises:
   calculating a difference value of the pixel for each prior query time based on a magnitude difference between the first sensing data and second sensing data during a predetermined time period prior to the query time;
   applying a time weight for each prior query time to the difference value for each time, respectively; and calculating, as the color value of the pixel at the query time, a time-weighted difference value of the pixel based on the difference values calculated during the predetermined time period and their respective applied time weights.

7. The method according to claim 6, wherein the time weight for each time has a higher value as it is closer to the query time.

8. The method according to claim 1, wherein determining if the abnormal situation occurred at the query time comprises:
   generating a situation secondary image by applying the situation image to a pre-learned situation determination model;
   calculating an anomaly score at the query time based on the situation image and the situation secondary image; and
   determining that the abnormal situation occurred at the query time when the anomaly score is higher than a preset threshold.

9. The method according to claim 8, wherein the situation determination model is trained to generate output data having a same data distribution as the data distribution of training samples used to train the situation determination model or having a minimum reconstruction error with respect to the data distribution of the training samples.

10. The method according to claim 9, wherein the training samples used for training include sensing data of a normal situation.

11. The method according to claim 8, wherein the situation determination model generates the situation secondary image having a smallest vector distance with respect to a situation image showing a normal situation.

12. The method according to claim 1, further comprising:
   detecting the sensor having sensed the abnormal situation based on the situation image, when it is determined that the abnormal situation occurred.

13. The method according to claim 12, wherein detecting the sensor comprises:
   generating a residual image at the query time based on the situation image and a situation secondary image generated by the situation determination model;
   determining a pixel having a larger color value than a preset residual threshold based on the color value of the pixel included in the residual image; and
   determining each sequence number of a plurality of sensors associated with the determined pixel by a coordinate of the determined pixel, and
   the residual threshold is larger than the color value of the pixel within the residual image generated based on the sensing data of the normal situation.

14. A non-transitory computer-readable medium for storing program instructions that can be read by a computing device and executed by the computing device, wherein when the program instructions are executed by a processor of the computing device, the program instructions enable the processor to perform the steps:
   receiving sensing data through a plurality of sensors at a query time;
   generating a situation image at the query time, showing the situation of the facility at the query time based on the sensing data, wherein generating the situation image comprises:
      arranging the sensing data of each sensor at the query time; and
      forming an N*N pixel set, wherein N is a total number of sensors in the plurality of sensors and each pixel is associated with a first sensor and a second sensor; and
   determining if an abnormal situation occurred at the query time by applying the situation image to a pre-learned situation determination model.

15. A system for determining a situation of a facility by imaging a sensing data of the facility, the system comprising:
   a plurality of sensors installed in the facility;
   a receiving device to receive sensing data through the plurality of sensors;
   an image conversion unit to generate a situation image showing the situation of the facility at the query time based on the sensing data, wherein the image conversion unit is configured to generate the situation image by:
      arranging the sensing data of each sensor at the query time; and
      forming an N*N pixel set, wherein N is a total number of sensors in the plurality of sensors and each pixel is associated with a first sensor and a second sensor;
   a situation determination unit to determine if an abnormal situation occurred at the query time by applying the situation image to a pre-learned situation determination model; and
   an anomaly location detection unit to detect the sensor having sensed an abnormal situation when the situation of at least a part of the facility is determined to be the abnormal situation.

16. The system according to claim 15, wherein the situation determination model is trained to generate output data having a same data distribution as the data distribution of the training sample sed to train the situation determination model or having a minimum reconstruction error with respect to the data distribution of the training samples.

17. The system according to claim 15, wherein the situation determination model generates a situation secondary image having a smallest vector distance with respect to a situation image showing a normal situation.

18. The system according to claim 15, wherein the anomaly location detection unit is configured to:
   generate a residual image at the query time based on the situation image and a situation secondary image generated by the situation determination model,
   determine a pixel having a larger color value than a preset residual threshold based on a color value of a pixel included in the residual image, and
   determine each sequence number of a plurality of sensors associated with the determined pixel by a coordinate of the determined pixel, and
   the residual threshold is larger than the color value of the pixel within the residual image generated based on the sensing data of the normal situation.

* * * * *